United States Patent
Narlikar et al.

(10) Patent No.: US 12,469,066 B2
(45) Date of Patent: Nov. 11, 2025

(54) SUGGESTING AN ITEM FOR GIFTING TO A USER OF AN ONLINE CONCIERGE SYSTEM

(71) Applicant: Maplebear Inc., San Francisco, CA (US)

(72) Inventors: Girija Narlikar, Palo Alto, CA (US); Karuna Ahuja, San Francisco, CA (US); Radhika Goel, San Francisco, CA (US); Chakshu Ahuja, San Jose, CA (US); Xiaoming Zhang, Toronto (CA); Devlina Das, Sunnyvale, CA (US)

(73) Assignee: Maplebear Inc., San Francisco, CA (US)

( * ) Notice: Subject to any disclaimer, the term of this patent is extended or adjusted under 35 U.S.C. 154(b) by 132 days.

(21) Appl. No.: 17/956,217

(22) Filed: Sep. 29, 2022

(65) Prior Publication Data

US 2024/0112238 A1  Apr. 4, 2024

(51) Int. Cl.
*G06Q 30/0601* (2023.01)
*G06Q 30/0203* (2023.01)
*G06Q 30/08* (2012.01)
*G06Q 50/00* (2024.01)

(52) U.S. Cl.
CPC ..... *G06Q 30/0631* (2013.01); *G06Q 30/0203* (2013.01); *G06Q 30/0603* (2013.01); *G06Q 30/08* (2013.01); *G06Q 50/01* (2013.01)

(58) Field of Classification Search
CPC .......... G06Q 30/0631; G06Q 30/0203; G06Q 30/0603; G06Q 30/08; G06Q 50/01
USPC ........................................................ 705/7.32
See application file for complete search history.

(56) References Cited

U.S. PATENT DOCUMENTS

| | | | |
|---|---|---|---|
| 11,367,117 B1 * | 6/2022 | Cheng | G06F 40/30 |
| 11,599,927 B1 * | 3/2023 | Flunkert | G06F 40/30 |
| 11,836,673 B2 * | 12/2023 | Glasgow | G06Q 10/087 |
| 2008/0301000 A1 * | 12/2008 | Roch | G06Q 30/0633 707/999.102 |
| 2014/0067595 A1 * | 3/2014 | Pavlidis | G06Q 30/0241 705/26.7 |
| 2014/0279187 A1 * | 9/2014 | Gopinath | G06Q 50/01 705/26.7 |

(Continued)

FOREIGN PATENT DOCUMENTS

| | | | |
|---|---|---|---|
| JP | 6766246 B1 * | 10/2020 | H04N 21/6581 |
| JP | 2021036396 A * | 3/2021 | |

*Primary Examiner* — Abdallah A El-Hage Hassan
(74) *Attorney, Agent, or Firm* — Fenwick & West LLP

(57) ABSTRACT

An online concierge system receives a request to purchase a gift for a user of the system and retrieves a profile associated with the user. Based on the profile and attributes of items included among inventories of one or more retailer locations, the system identifies a set of candidate items for which the user is likely to have an affinity. The system accesses a machine learning model trained to predict a giftability score for an item and applies the model to attributes of each candidate item to predict its giftability score. Based on its giftability score and the profile, the system computes a composite score for each candidate item indicating an appropriateness of gifting the candidate item to the user. The system ranks the set of candidate items based on the composite scores and selects one or more suggested items for gifting to the user based on the ranking.

18 Claims, 5 Drawing Sheets

(56) References Cited

U.S. PATENT DOCUMENTS

| | | | |
|---|---|---|---|
| 2015/0205802 A1* | 7/2015 | Levinsky | G06F 16/951 |
| | | | 707/706 |
| 2016/0071118 A1* | 3/2016 | Chiao | G06Q 10/067 |
| | | | 705/7.29 |
| 2018/0268065 A1* | 9/2018 | Parepally | G06N 20/00 |
| 2021/0279665 A1* | 9/2021 | Glasgow | G06Q 10/06315 |
| 2022/0335489 A1* | 10/2022 | Rao Karikurve | G06Q 30/0603 |

* cited by examiner

SUGGESTING AN ITEM FOR GIFTING TO A USER OF AN ONLINE CONCIERGE SYSTEM

BACKGROUND

Online concierge systems, which allow customers to place online delivery orders and match the orders with pickers who service the orders at retailer locations on behalf of the customers, may allow their customers to purchase gifts for other customers of the online concierge systems. To help customers select the gifts, the online concierge systems may suggest gifts for specific customers. They may do so based on customer data maintained in the online concierge systems describing attributes of the customers (e.g., preferences, favorite items, etc.), their order histories, etc. and item data maintained by the online concierge systems describing attributes of various items (e.g., brands, prices, colors, etc.) included among the inventories of retailer locations. For example, if a first customer of an online concierge system frequently purchases a particular chocolate item, the online concierge system may suggest the same chocolate item to a second customer of the online concierge system who is searching for a gift for the first customer.

However, since online concierge systems may allow their customers to order a wide variety of items from various retailers, which may include groceries and basic household items, items suggested as gifts based on customer data maintained by the online concierge systems may not be appropriate for gifting. For example, if the chocolate item purchased by the first customer in the above example is used for baking (e.g., chocolate chips), it may not be an appropriate gift. As an additional example, although items included in a list of favorite items for a customer of an online concierge system may include milk, eggs, bread, paper towels, and diapers, none of these items may be appropriate for gifting.

SUMMARY

In accordance with one or more aspects of the disclosure, an online concierge system suggests an item for gifting to a user of the online concierge system. More specifically, the online concierge system receives a request to purchase a gift for a user of the online concierge system and retrieves a profile associated with the user. Based on the profile and attributes of items included among inventories of one or more retailer locations, the online concierge system identifies a set of candidate items for which the user is likely to have an affinity. The online concierge system then accesses a machine learning model trained to predict a giftability score for an item and applies the model to attributes of each candidate item to predict its giftability score. Based on the giftability score and profile associated with the user, the online concierge system computes a composite score for each candidate item indicating an appropriateness of gifting the candidate item to the user. The online concierge system then ranks the set of candidate items based on their composite scores and selects one or more suggested candidate items for gifting to the user based on the ranking.

DETAILED DESCRIPTION

Figure 1:
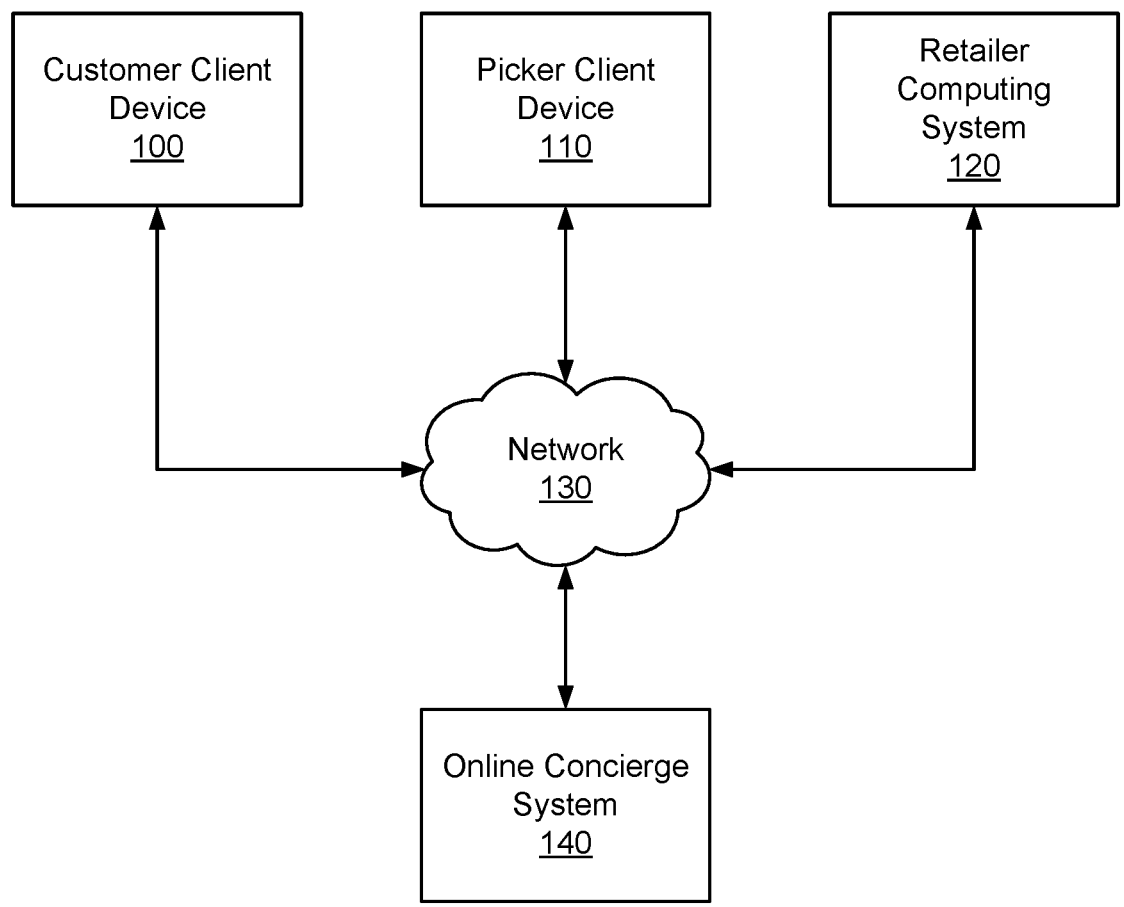
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. In some embodiments, items may include gift cards that may be used to purchase other goods or products through the online concierge system 140. For example, a gift card may have a specific prepaid cash value that may be used to purchase items from a retailer by placing an order including items at a corresponding retailer location through the online concierge system 140. In this example, the gift card may be available exclusively through an online storefront for the retailer. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
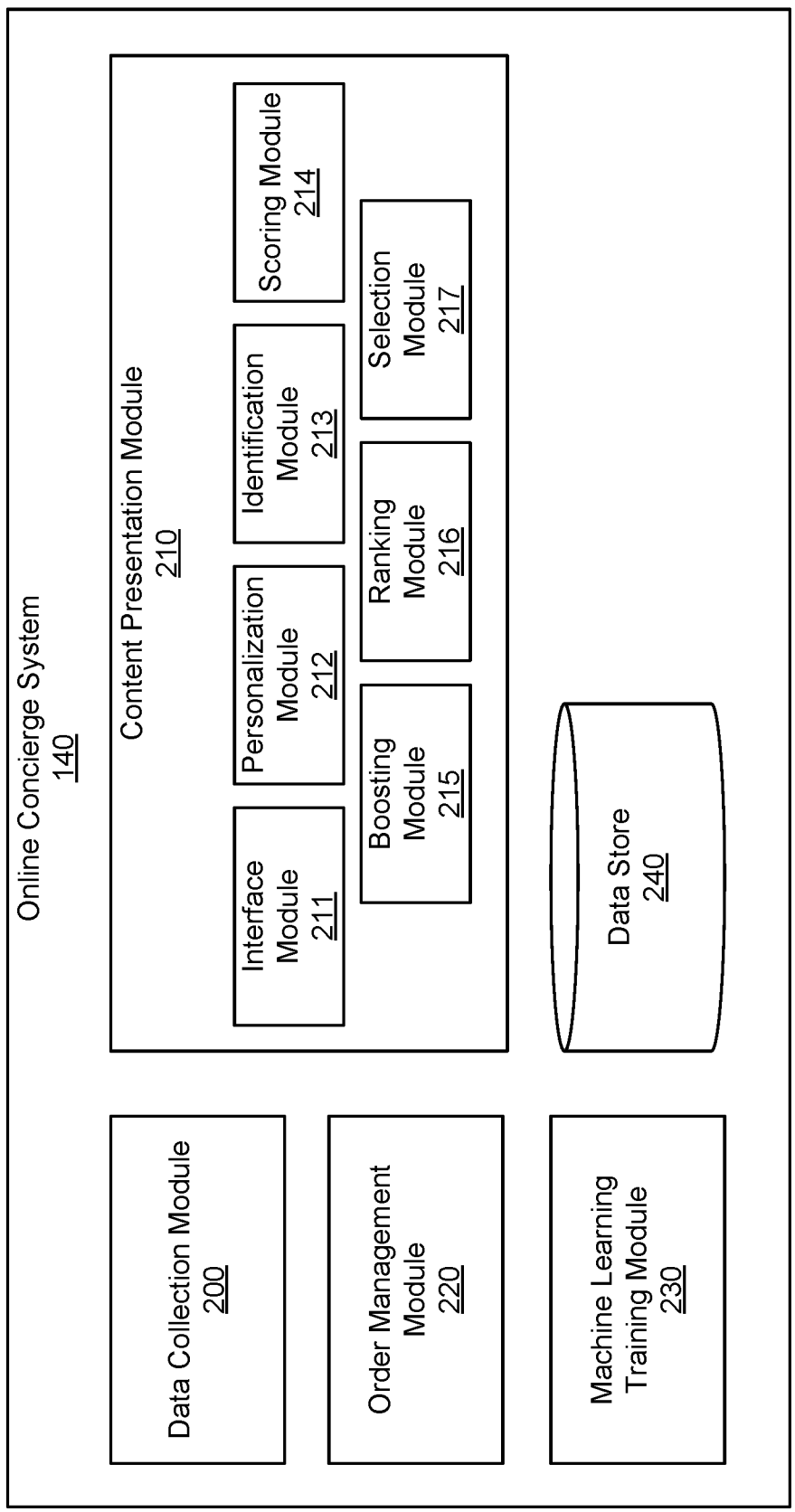
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer, into a profile associated with the customer. Customer data included in a profile may include attributes of a customer, such as the customer's name, address, shopping preferences, stored payment instruments, or default settings established by the customer (e.g., a default retailer/retailer location, payment instrument, delivery location, or delivery timeframe). Attributes of a customer included in a profile also may include the customer's dietary preferences (e.g., restrictions, allergies, or dislikes), contact information (e.g., phone number or email address), demographic information (e.g., age, gender, geographic location, etc.) associated with the customer, or any other suitable attributes of the customer. A profile associated with a customer also may include a list of items for which the customer has expressed a preference (e.g., a list of favorite items, a wish list, etc.) and an order history for the customer.

The data collection module 200 may collect the customer data from sensors on the customer client device 100 or based on the customer's interactions with the online concierge system 140 (e.g., responses to questionnaires presented to the customer periodically or during creation of an account with the online concierge system 140). For example, the data collection module 200 may collect customer data included in a customer's response to a questionnaire about whether the customer has an affinity for various items or items related to an item the customer recently added to a wish list (e.g., items of the same or a similar type, items of the same brand, etc.). In some embodiments, customer data included in a profile may be inferred by the data collection module 200 (e.g., using a machine learning model) based on other information included in the profile. For example, based on a frequency with which items including chocolate are included in orders placed by a customer, the data collection module 200 may infer that the customer likes chocolate and may include the inference in a profile associated with the customer.

In some embodiments, a customer may grant permission to the online concierge system 140 to share or collect customer data associated with the customer. In various embodiments, a customer may grant permission to the online concierge system 140 to share a portion of their profile with other customers of the online concierge system 140. For example, a customer may select an option to make a wish list included in their profile public, such that other customers of the online concierge system 140 may view items included in the wish list. As an additional example, customers may select an option to allow other customers of the online concierge system 140 to "follow" them, such that customers may view certain information associated with the customers they are following (e.g., items the customers being followed recently designated as favorite items). In some embodiments, the data collection module 200 may collect customer data from one or more online systems, such as social networking systems. In such embodiments, the data collection module 200 may collect the customer data for a customer from an online system (e.g., information describing actions associated with items performed by the customer in the online system) in response to receiving permission from the customer to access the customer data. For example, suppose that a customer posts information to a social networking system indicating an affinity for an item (e.g., a discovery of a new favorite item) and the customer has granted permission to the online concierge system 140 to access information posted to the social networking system. In this example, the online concierge system 140 may collect the posted information and other information associated with the customer in the social networking system and add it to a profile associated with the customer.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight/volume, stock keeping unit (SKU), price, brand, nutritional information, ingredients/materials, version/model (e.g., low sodium, sugar free, wireless, etc.), serial number, or any other suitable attributes of the items. In some embodiments, item data for an item also may include information describing additional items or item categories (described below) related to the item. For example, suppose that an item corresponding to a dark chocolate candy belongs to a dark chocolate candy item category and pairs well with other items corresponding to wines belonging to multiple wine item categories (e.g., Zinfandel, Cabernet Sauvignon, and Merlot). In this example, the dark chocolate candy item may be associated with the wine items and the dark chocolate candy and wine item categories, such that the dark chocolate candy item may be identified based on the item data that describes the dark chocolate candy item, the wine items, the dark chocolate candy item category, and the wine item categories.

The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. In some embodiments, item categories may be broader in that the same item category may include a wide variety of items that are related to a common theme, found in the same department, etc., but may not be considered equivalent to each other or may not be replacements for each other in an order. For example, gourmet chocolates and caviar may both be included in a "gourmet gift" item category, but are not considered equivalent to each other and cannot be replacements for each other in an order. Examples of these item categories include groceries, alcohol, tobacco, pharmaceuticals, gifts, clothing, accessories, personal care, books, electronics, furniture, houseware, toys, sporting goods, pet supplies, baby supplies, arts and crafts supplies, office supplies, party supplies, cleaning supplies, home improvement, appliances, etc. The item categories may be human-generated and human-populated with items. The item categories also may be generated automatically by the online concierge system 140 (e.g., using a clustering algorithm).

In some embodiments, the data collection module 200 maintains a taxonomy of items included among the inventories of one or more retailer locations. For example, the data collection module 200 receives a catalog of items from a retailer location identifying items offered for purchase by the retailer location. From the catalog of items, the data collection module 200 determines a taxonomy of items offered by the retailer location, in which different levels of the taxonomy provide different levels of specificity about items included in the levels. In various embodiments, the taxonomy identifies an item category and associates one or more specific items with the item category. For example, an item category identifies "milk," and the taxonomy associates identifiers of different milk items (e.g., milk offered by different brands, milk having one or more different attributes, etc.) with the item category. Thus, the taxonomy maintains associations between an item category and specific items offered by the retailer location matching the item category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in an item category, while items in higher levels of the hierarchical taxonomy have a fewer number of attributes, corresponding to less specificity in an item category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a retailer location in various embodiments. In other embodiments, the data collection module 200 applies a trained classification model to a catalog of items received from a retailer location to include different items in levels of the taxonomy, so application of the trained classification model associates specific items with categories corresponding to levels within the taxonomy.

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, order data also may include information indicating one or more items included in an order are gifts. Examples of such information may include a gift receipt associated with the order, a gift message associated with the order, etc.

The content presentation module 210 selects content for presentation to a customer. For example, the content presentation module 210 selects which items to present to a customer while the customer is placing an order. Components of the content presentation module 210 include an interface module 211, a personalization module 212, an identification module 213, a scoring module 214, a boosting module 215, a ranking module 216, and a selection module 217.

The interface module 211 generates and transmits the ordering interface for the customer to order items. The interface module 211 also populates the ordering interface with items that the customer may select for adding to their order. In some embodiments, the interface module 211 presents a catalog of all items that are available to the customer, which the customer can browse to select items to order. In some embodiments, the interface module 211 receives a request to purchase a gift for a customer (a "target customer") of the online concierge system 140 from another customer (a "requesting customer") of the online concierge system 140. For example, the interface module 211 may receive a request from a customer client device 100 associated with the requesting customer to purchase a gift for the target customer via the ordering interface. The target customer may be identified in the request based on information included in a profile associated with the target customer that uniquely identifies them (e.g., a phone number or email address or some combination of information that uniquely identifies the target customer, such as a first and last name and a home address). In some embodiments, the request also may specify whether the gift is for a specific occasion, demographic, etc. In the above example, the request may indicate that the gift is for an occasion corresponding to a baby shower and for a demographic corresponding to males under the age of three. In some embodiments, the target customer may have never placed an order using the online concierge system 140. In such embodiments, if the personalization module 212 (described below) is unable to retrieve a profile associated with the target customer, the interface module 211 may prompt the requesting customer for additional information about the target customer (e.g., their age, gender, preferences, etc.).

The content presentation module 210 also may identify items that the customer is most likely to order and present those items to the customer. For example, the scoring module 214 may score items and the ranking module 216 may rank the items based on their scores. The interface module 211 displays the items selected by the selection module 217 with scores that exceed some threshold (e.g., the top n items or the p percentile of items).

The scoring module 214 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the scoring module 214 scores items based on a search query received from the customer client device 100. A search query is text for a word or set of words that indicate items of interest to the customer. The scoring module 214 scores items based on a relatedness of the items to the search query. For example, the scoring module 214 may apply natural language processing (NLP) techniques to the text in the search query to generate a search query representation (e.g., a search query embedding) that represents characteristics of the search query. The scoring module 214 may use the search query representation to score candidate items for presentation to a customer (e.g., by comparing a search query embedding to an item embedding).

In some embodiments, the scoring module 214 scores items based on a predicted availability of an item. The scoring module 214 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The selection module 217 may weight the score for an item based on the predicted availability of the item. Alternatively, the selection module 217 may filter out items from presentation to a customer based on whether the predicted availability of the item exceeds a threshold.

In some embodiments, content is selected for presentation to a requesting customer by the content presentation module 210 based on a request to purchase a gift for a target customer of the online concierge system 140 received from the customer client device 100 associated with the requesting customer. In such embodiments, the personalization module 212 may retrieve a profile associated with the target customer from the data store 240 and the identification module 213 may identify a set of candidate items for which the target customer is likely to have an affinity. The set of candidate items may be identified based on the profile associated with the target customer and attributes associated with items included among the inventories of one or more retailer locations. For example, based on an order history included in a profile associated with the target customer, the identification module 213 may identify one or more candidate items associated with attributes that have at least a threshold measure of similarity to attributes of items included in orders previously placed by the target customer. In the above example, based on a wish list and preferences of the target customer included in the profile, the identification module 213 also may identify additional candidate items that match one or more items included in the wish list or are associated with attributes for which the target customer has expressed a preference. In some embodiments, the set of candidate items also may be identified based on item data for a candidate item that describes additional items or one or more item categories related to the candidate item. For example, a candidate item corresponding to a cheese that belongs to a cheese item category and pairs well with items corresponding to whole wheat crackers and sea salt crackers belonging to a cracker item category may be identified based on item data for the cheese that describes the cheese, the whole wheat crackers, the sea salt crackers, the cracker item category, and the cheese item category.

In some embodiments, the identification module 213 may use an item affinity model to identify the set of candidate items for which the target customer is likely to have an affinity. An item affinity model is a machine learning model that is trained to predict a likelihood that a customer will have an affinity for an item based on item data for the item and customer data for the customer. For example, the item affinity model predicts a likelihood that the target customer will like an item based on customer data for the target customer and item data for the item. The identification module 213 may include an item among the set of candidate items for which the target customer is likely to have an affinity if the predicted likelihood that the target customer will have an affinity for the item is at least a threshold likelihood. The item affinity model may be trained by the machine learning training module 230 based on item data for items included among the inventories of one or more retailer locations and customer data for various customers. For example, the item affinity model may be trained based on attributes of items (e.g., their brands, item categories, prices, etc.) and information included among the profiles associated with customers (e.g., items included in their wish lists, their order histories and preferences, demographic information associated with the customers, etc.).

In some embodiments, the item affinity model uses item embeddings describing items and a customer embedding describing the target customer to predict the likelihoods that the target customer will have an affinity for the items (e.g., based on a cosine similarity, a Euclidean distance, or any other similarity measure used to compare an item embedding to the customer embedding). For example, the item affinity model predicts a likelihood that the target customer will have an affinity for an item based on a proximity between a customer embedding associated with the target customer and an item embedding associated with the item. In this example, the identification module 213 may identify the item as a candidate item for which the target customer is likely to have an affinity if the embeddings are within a threshold distance from each other. The item embeddings and the customer embedding may be generated by separate machine learning models and may be stored in the data store 240.

In some embodiments, the identification module 213 also may identify the set of candidate items for which the target customer is likely to have an affinity based on a budget, an item category, or any other information specified by the requesting customer. For example, the identification module 213 may identify the set of candidate items based on a budget for a gift specified by the requesting customer, such that the set of candidate items do not include any items having a price that is greater than the specified budget. As an additional example, the identification module 213 may identify the set of candidate items based on an electronics item category specified by the requesting customer, such that the set of candidate items only include items in the electronics item category. As described above, in some embodiments, the personalization module 212 may be unable to retrieve a profile associated with the target customer (e.g., if the target customer has never placed an order using the online concierge system 140) and the interface module 211 receives additional information about the target customer (e.g., in response to prompting the requesting customer for the additional information). In such embodiments, the identification module 213 may identify the set of candidate items for which the target customer is likely to have an affinity based on the additional information associated with the target customer and attributes associated with items included among the inventories of one or more retailer locations.

In various embodiments, the set of candidate items for which the target customer is likely to have an affinity identified by the identification module 213 may include one or more items included among an inventory of a retailer location associated with a retailer from which the target customer has never purchased any items. For example, suppose that the data collection module 200 has inferred that the target customer likes cosmetics based on an order history included in a profile associated with the target customer indicating that the target customer has frequently purchased items belonging to a cosmetics item category from various drug stores. In this example, a set of candidate items identified by the identification module 213 may include a gift card for a retailer that primarily sells cosmetics even though the target customer has never purchased items from the retailer.

In embodiments in which the identification module 213 identifies the set of candidate items for which the target customer is likely to have an affinity, the scoring module 212 may access a giftability model that is trained to predict a giftability score for an item based on item data for the item and apply the giftability model to attributes associated with each candidate item to predict a giftability score for the candidate item. A giftability score for an item indicates an appropriateness of gifting the item. For example, a giftability score for a box of gourmet chocolates that is packaged in a box that is gift wrapped with a bow is associated with a higher giftability score than a bar of chocolate that is packaged in a paper and cellophane wrapper, indicating that the former item is more appropriate for gifting than the latter item. The giftability model may be trained by the machine learning training module 230, as further described below. In some embodiments, the giftability score for an item indicates an appropriateness of gifting the item for an occasion, demographic, etc. specified by the requesting customer. For example, suppose that the requesting customer specifies in a request to purchase a gift for the target customer that the gift is for an occasion corresponding to a birthday for a demographic corresponding to females between the ages of 12 and 17. In this example, if a giftability score for a collection of DVDs is higher than a giftability score for a collection of books, the giftability scores indicate that the collection of DVDs is more appropriate for gifting for the specified occasion and demographic than the collection of books.

Once the scoring module 212 has applied the giftability model to attributes associated with a candidate item to predict a giftability score for the candidate item, the scoring module 212 may compute a composite score associated with the candidate item indicating an appropriateness of gifting the candidate item to the target customer. The composite score associated with a candidate item may be computed by the scoring module 212 based on the giftability score associated with the candidate item and the profile associated with the target customer. Additionally, the scoring module 212 may use an item embedding describing a candidate item and a customer embedding describing the target customer to compute the composite score associated with the candidate item. For example, the composite score associated with a candidate item may be computed as a product of the giftability score for the candidate item and a dot product of an item embedding describing the candidate item and a customer embedding describing the target customer. The item embedding describing a candidate item and the customer embedding describing the target customer may be generated by separate machine learning models and may be stored in the data store 240.

In some embodiments, the boosting module 215 may boost a composite score associated with a candidate item. In such embodiments, the composite score may be boosted based on a bid value associated with the candidate item. A bid value associated with a candidate item may be received from a retailer associated with a retailer location, a manufacturer associated with the candidate item, or any other suitable entity. For example, if a candidate item is included among an inventory of a retailer location, the boosting module 215 may receive a bid value associated with the candidate item from the retailer. A boosted composite score may be computed as a sum, a product, or any other mathematical operation performed on a bid value and a composite score associated with a candidate item. For example, the boosting module 215 may boost a composite score associated with a candidate item by adding a bid value associated with the candidate item to the composite score.

The ranking module 216 may rank a set of candidate items based on a composite score associated with each candidate item. For example, the ranking module 216 may rank candidate items based on their composite scores, such that items having higher composite scores are ranked higher than items having lower composite scores. In embodiments in which the boosting module 215 boosts a composite score for a candidate item, the ranking module 216 may rank the candidate item based on its boosted composite score. For example, the ranking module 216 may rank candidate items based on their composite scores or boosted composite scores, whichever is higher, such that candidate items having higher composite scores or boosted composite scores are ranked higher than candidate items having lower composite scores or boosted composite scores.

The selection module 217 may select one or more suggested items from the set of candidate items for which the target customer is likely to have an affinity for gifting to the target customer. In some embodiments, once the ranking module 216 has ranked the set of candidate items, the selection module 217 may select one or more suggested items for gifting to the target customer based on the ranking. For example, the selection module 217 may select one or more of the set of candidate items with ranks that exceed some threshold (e.g., the top n ranked items) for gifting to the target customer. In various embodiments, the selection module 217 may select the suggested item(s) for gifting to the target customer based on composite scores or boosted composite scores associated with the set of candidate items. For example, the selection module 217 may select one or more candidate items from the set of candidate items with composite scores or boosted composite scores that exceed some threshold.

The interface module 211 may send one or more suggested items for gifting to the target customer to a display area of the customer client device 100 associated with the requesting customer. For example, once the selection module 217 has selected one or more suggested items for gifting to the target customer from the set of candidate items, the interface module 211 may send the suggested item(s) to the display area of the customer client device 100 associated with the requesting customer. In some embodiments, the interface module 211 may send a ranking of the set of candidate items to the display area of the customer client device 100 associated with the requesting customer. For example, once the ranking module 216 has ranked the set of candidate items, the interface module 211 sends the ranking to the display area of the customer client device 100 associated with the requesting customer.

The order management module 220 manages orders for items from customers. The order management module 220 receives orders from a customer client device 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the scoring module 212 accesses a giftability model, the machine learning training module 230 may train the giftability model. The machine learning training module 230 may do so via supervised learning based on item data for items included among the inventories of one or more retailer locations and a label for each item indicating an appropriateness of gifting the item. For example, the machine learning training module 230 may receive a set of training examples including attributes of items included among inventories of one or more retailer locations. In this example, the machine learning training module 230 also may receive a human-generated label for each item indicating an appropriateness of gifting the item. Continuing with this example, the machine learning training module 230 may then train the giftability model based on the attributes of the items and the label for each item by comparing its output from input data of each training example to the label for the training example.

The label for an item may be determined or updated based on various types of information associated with the item. Examples of such information include order information indicating that the item was a gift, a description from a manufacturer of the item indicating an appropriateness of gifting the item, a response to suggesting the item as a gift for a customer of the online concierge system 140, an item category associated with the item, packaging for the item, a price of the item, etc. For example, if order data for at least a threshold percentage of orders including an item includes a gift receipt or a gift message associated with the orders or if the item is included in a "gift" item category, the item may be labeled to indicate it may be appropriate for gifting. As an additional example, if a description of an item provided by its manufacturer includes the words "great gift idea," the packaging for the item includes gift wrap, a bow, a basket, or other gift packaging, and the price of the item is at least a threshold price, the item may be labeled to indicate it may be appropriate for gifting. As yet another example, suppose that an item that has been labeled as appropriate for gifting has been selected by the selection module 217 as a suggested item for gifting to customers of the online concierge system 140. In this example, the label for the item may be updated to indicate it may not be appropriate for gifting if the item is subsequently purchased for gifting to customers less than a threshold percentage of times it was selected by the selection module 217 or if the customers to whom the item was suggested indicated that it may not be appropriate for gifting (e.g., by closing a window presenting the item).

In some embodiments, the machine learning training module 230 also may train the giftability model based on a label for each item indicating an appropriateness of gifting the item for a specific occasion, demographic, etc. In such embodiments, the label for an item may be determined or updated based on order information indicating that the item was a gift for a specific occasion, demographic, etc., a description from a manufacturer of the item indicating an appropriateness of gifting the item for a specific occasion, demographic, etc., or a response to suggesting the item as a gift for a customer of the online concierge system 140 for a specific occasion, demographic, etc. In such embodiments, the label for an item also may be determined or updated based on an item category associated with the item, packaging for the item, a price of the item, etc. For example, if order data for at least a threshold percentage of orders including an item includes a gift message associated with the orders including the word "wedding" or if the item is included in a "wedding gift" item category, the item may be labeled to indicate it may be appropriate for gifting for a wedding. As an additional example, if a description of an item provided by its manufacturer includes the words "great graduation gift idea," the packaging for the item includes gift wrap with an image of a graduation cap and the words "congratulations graduate," and the price of the item is at least a threshold price, the item may be labeled to indicate it may be appropriate for gifting for a graduation. As yet another example, suppose that an item that has been labeled as appropriate for gifting for males between 12 and 17 years old has been selected by the selection module 217 as a suggested item for gifting to customers of the online concierge system 140. In this example, the label for the item may be updated to indicate it may not be appropriate for gifting for males between 12 and 17 years old if the item is subsequently purchased for gifting to customers less than a threshold percentage of times it was selected by the selection module 217 or if the customers to whom the item was suggested indicated that it may not be appropriate for gifting for this demographic.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Suggesting an Item for Gifting to a User of an Online Concierge System

Figure 3:
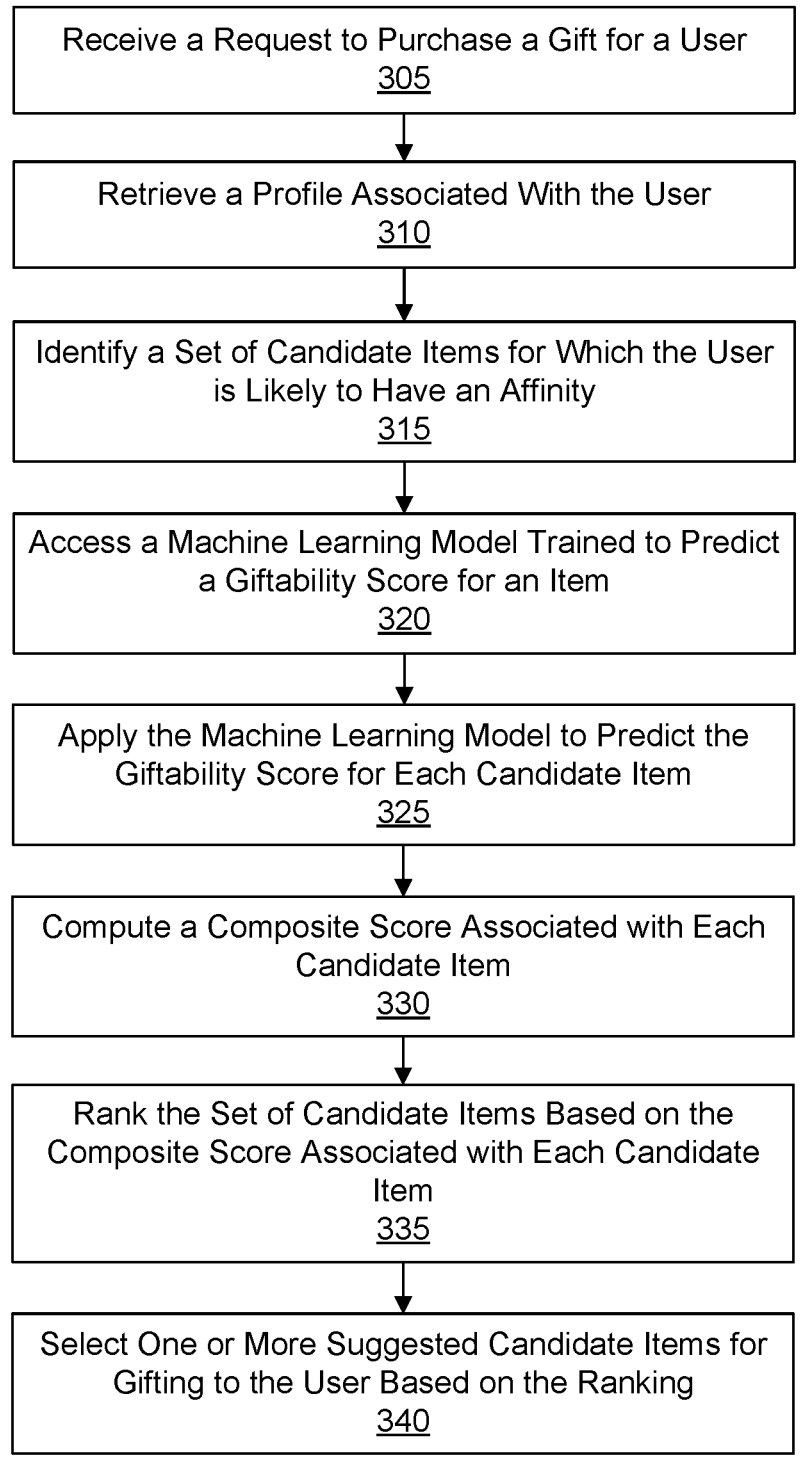
FIG. 3 is a flowchart of a method for suggesting an item for gifting to a user of an online concierge system, in accordance with one or more embodiments.

FIG. 3 is a flowchart for a method for suggesting an item for gifting to a user of an online concierge system, in accordance with one or more embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 receives 305 (e.g., via the interface module 211) a request to purchase a gift for a user (a "target customer") of the online concierge system 140. The online concierge system 140 may receive 305 the request from a customer client device 100 associated with another user (a "requesting customer") of the online concierge system 140. For example, the online concierge system 140 may receive 305 the request from a customer client device 100 associated with the requesting customer to purchase a gift for the target customer of the online concierge system 140. The online concierge system 140 may receive 305 the request via an ordering interface generated and transmitted by the online concierge system 140 (e.g., via the interface module 211). The target customer may be identified in the request based on information included in a profile associated with the target customer that uniquely identifies them (e.g., a phone number or email address or some combination of information that uniquely identifies the target customer, such as a first and last name and a home address). Alternatively the target customer may be identified using a unique code generated, e.g., based on past login activity, but that does not contain personally identifiable information (PII), thereby preserving the user's privacy. In some embodiments, the request also may specify whether the gift is for a specific occasion, demographic, etc. In the above example, the request may indicate that the gift is for an occasion corresponding to a baby shower and for a demographic corresponding to males under the age of three.

The online concierge system 140 then retrieves 310 (e.g., using the personalization module 212) a profile associated with the target customer (e.g., from the data store 240). The profile may include attributes of the target customer, such as the target customer's name, address, shopping preferences, stored payment instruments, or default settings established by the target customer (e.g., a default retailer/retailer location, payment instrument, delivery location, or delivery timeframe). Attributes of the target customer included in the profile also may include the target customer's dietary preferences (e.g., restrictions, allergies, or dislikes), contact information (e.g., phone number or email address), demographic information (e.g., age, gender, geographic location, etc.) associated with the target customer, or any other suitable attributes of the target customer. The profile associated with the target customer also may include a list of items for which the target customer has expressed a preference (e.g., a list of favorite items, a wish list, etc.) and an order history for the target customer.

The online concierge system 140 may collect (e.g., using the data collection module 200) the customer data included in the profile from sensors on the customer client device 100 associated with the target customer or based on the target customer's interactions with the online concierge system 140 (e.g., responses to questionnaires presented to the target customer periodically or during creation of an account with the online concierge system 140). For example, the online concierge system 140 may collect customer data included in the target customer's response to a questionnaire about whether the target customer has an affinity for various items or items related to an item the target customer recently added to a wish list (e.g., items of the same or a similar type, items of the same brand, etc.). In some embodiments, customer data included in a profile may be inferred by the online concierge system 140 (e.g., using a machine learning model) based on other information included in the profile. For example, based on a frequency with which items including chocolate are included in orders placed by the target customer, the online concierge system 140 may infer that the target customer likes chocolate and may include the inference in the profile associated with the target customer.

In some embodiments, the target customer may grant permission to the online concierge system 140 to share or collect customer data associated with the target customer. In various embodiments, the target customer may grant permission to the online concierge system 140 to share a portion of their profile with other customers of the online concierge system 140. For example, the target customer may select an option to make a wish list included in their profile public, such that the requesting customer and other customers of the online concierge system 140 may view items included in the wish list. As an additional example, the target customer may select an option to allow other customers of the online concierge system 140 to "follow" them, such that customers may view certain information associated with the target customer (e.g., items the target customer recently designated as favorite items). In some embodiments, the online concierge system 140 may collect customer data for the target customer from one or more online systems, such as social networking systems. In such embodiments, the online concierge system 140 may collect the customer data for the target customer from an online system (e.g., information describing actions associated with items performed by the target customer in the online system) in response to receiving permission from the target customer to access the customer data. For example, suppose that the target customer posts information to a social networking system indicating an affinity for an item (e.g., a discovery of a new favorite item) and the target customer has granted permission to the online concierge system 140 to access information posted to the social networking system. In this example, the online concierge system 140 may collect the posted information and other information associated with the target customer in the social networking system and add it to the profile associated with the target customer.

In some embodiments, the online concierge system 140 may be unable to retrieve 310 a profile associated with the target customer (e.g., if the target customer has never placed an order using the online concierge system 140). In such embodiments, the online concierge system 140 may prompt (e.g., using the interface module 211) the requesting customer for additional information about the target customer (e.g., their age, gender, preferences, etc.). The online concierge system 140 may then receive (e.g., via the interface module 211) this additional information about the target customer in response to the prompt.

Figure 4A:
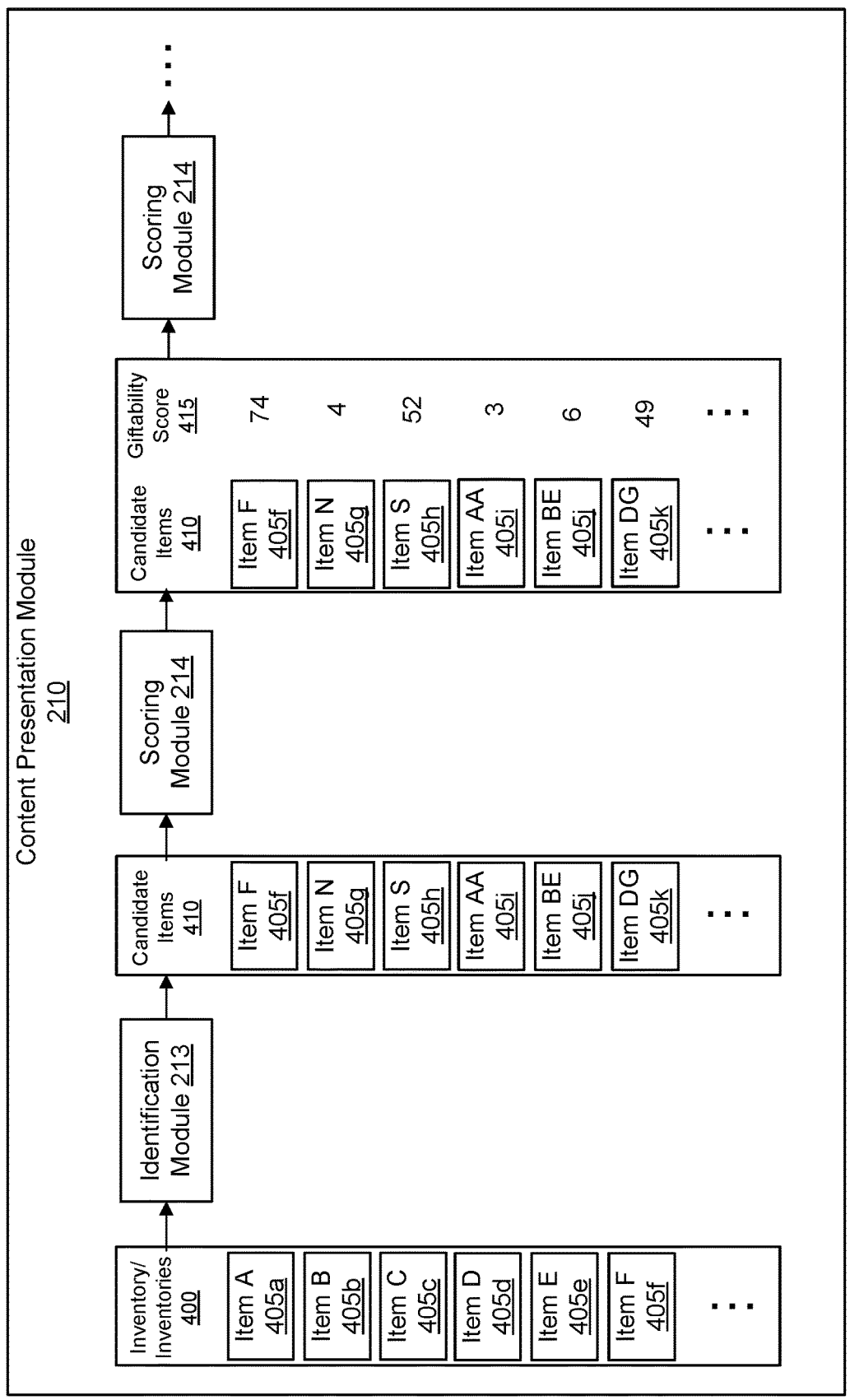
FIGS. 4A and 4B illustrate a conceptual diagram of a method for suggesting an item for gifting to a user of an online concierge system, in accordance with one or more embodiments.

The online concierge system 140 then identifies 315 (e.g., using the identification module 213) a set of candidate items for which the target customer is likely to have an affinity. The set of candidate items may be identified 315 based on the profile associated with the target customer and attributes associated with items included among the inventories of one or more retailer locations. For example, as shown in FIG. 4A, which illustrates a conceptual diagram of a method for suggesting an item for gifting to a user of an online concierge system 140, in accordance with one or more embodiments, the online concierge system 140 identifies 315 the set of candidate items 410 from multiple items 405 included among the inventories 400 of one or more retailer locations. In this example, one or more of the candidate items 410 may be identified 315 based on an order history included in the profile associated with the target customer, such that the candidate item(s) 410 may be associated with attributes that have at least a threshold measure of similarity to attributes of items 405 included in orders previously placed by the target customer. In the above example, some of the candidate items 410 also may be identified 315 based on a wish list and preferences of the target customer included in the profile, such that these candidate items 410 match one or more items 405 included in the wish list or are associated with attributes for which the target customer has expressed a preference. In various embodiments, attributes associated with items 405 are included in a catalog of items 405 or a taxonomy of items 405. For example, a catalog of items 405 received from a retailer identifying items 405 offered for purchase by the retailer may include one or more item categories associated with each item 405 and attributes of each item 405 included in a description of the item 405. As an additional example, a taxonomy maintained by the online concierge system 140 (e.g., by the data collection module 200) describes associations between an item category and specific items 405 offered by a retailer location matching the item category, in which different levels of the taxonomy identify items 405 with differing levels of specificity based on one or more attributes of the items 405.

In some embodiments, the set of candidate items 410 also may be identified 315 based on item data for a candidate item 410 that describes additional items 405 or one or more item categories related to the candidate item 410. For example, suppose that an item 405 corresponding to a dark chocolate candy belongs to a dark chocolate candy item category and pairs well with other items 405 corresponding to wines belonging to multiple wine item categories (e.g., Zinfandel, Cabernet Sauvignon, and Merlot). In this example, the dark chocolate candy item 405 may be associated with the wine items 405 and the dark chocolate candy and wine item categories, such that the dark chocolate candy item 405 may be identified 315 based on the item data that describes the dark chocolate candy item 405, the wine items 405, the dark chocolate candy item category, and the wine item categories.

In some embodiments, the online concierge system 140 may use an item affinity model to identify 315 the set of candidate items 410 for which the target customer is likely to have an affinity. An item affinity model is a machine learning model that is trained to predict a likelihood that a customer will have an affinity for an item 405 based on item data for the item 405 and customer data for the customer. For example, the item affinity model predicts a likelihood that the target customer will like an item 405 based on customer data for the target customer and item data for the item 405. The online concierge system 140 may include an item 405 among the set of candidate items 410 for which the target customer is likely to have an affinity if the predicted likelihood that the target customer will have an affinity for the item 405 is at least a threshold likelihood. The item affinity model may be trained by the online concierge system 140 (e.g., using the machine learning training module 230) based on item data for items 405 included among the inventories 400 of one or more retailer locations and customer data for various customers. For example, the item affinity model may be trained based on attributes of items 405 (e.g., their brands, item categories, prices, etc.) and information included among the profiles associated with customers (e.g., items 405 included in their wish lists, their order histories and preferences, demographic information associated with the customers, etc.).

In some embodiments, the item affinity model uses item embeddings describing items 405 and a customer embedding describing the target customer to predict the likelihoods that the target customer will have an affinity for the items 405 (e.g., based on a cosine similarity, a Euclidean distance, or any other similarity measure used to compare an item embedding to the customer embedding). For example, the item affinity model predicts a likelihood that the target customer will have an affinity for an item 405 based on a proximity between a customer embedding associated with the target customer and an item embedding associated with the item 405. In this example, the online concierge system 140 may identify 315 the item 405 as a candidate item 410 for which the target customer is likely to have an affinity if the embeddings are within a threshold distance from each other. The item embeddings and the customer embedding may be generated by separate machine learning models and may be stored (e.g., in the data store 240).

In some embodiments, the online concierge system 140 also may identify 315 the set of candidate items 410 based on a budget, an item category, or any other information specified by the requesting customer. For example, the online concierge system 140 may identify 315 the set of candidate items 410 based on a budget for the gift specified by the requesting customer, such that the set of candidate items 410 do not include any items 405 having a price that is greater than the specified budget. As an additional example, the online concierge system 140 may identify 315 the set of candidate items 410 based on an electronics item category specified by the requesting customer, such that the set of candidate items 410 only include items 405 in the electronics item category. As described above, in some embodiments, the online concierge system 140 may be unable to retrieve 310 a profile associated with the target customer and the online concierge system 140 may receive additional information about the target customer in response to prompting the requesting customer for this additional information. In such embodiments, the online concierge system 140 may identify 315 the set of candidate items 410 for which the target customer is likely to have an affinity based on the additional information associated with the target customer and attributes associated with items 405 included among the inventories 400 of one or more retailer locations.

In various embodiments, the set of candidate items 410 identified 315 by the online concierge system 140 may include one or more items 405 included among an inventory 400 of a retailer location associated with a retailer from which the target customer has never purchased any items 405. For example, suppose that the online concierge system 140 has inferred that the target customer likes cosmetics based on an order history included in the profile associated with the target customer indicating that the target customer has frequently purchased items 405 belonging to a cosmetics item category from various drug stores. In this example, the set of candidate items 410 identified 315 by the online concierge system 140 may include a gift card for a retailer that primarily sells cosmetics even though the target customer has never purchased items 405 from the retailer.

Referring back to FIG. 3, the online concierge system 140 then accesses 320 (e.g., using the scoring module 212) a giftability model that is trained to predict a giftability score for an item 405 based on item data for the item 405. A giftability score for an item 405 indicates an appropriateness of gifting the item 405. For example, a giftability score for a box of gourmet chocolates that is packaged in a box that is gift wrapped with a bow is associated with a higher giftability score than a bar of chocolate that is packaged in a paper and cellophane wrapper, indicating that the former item 405 is more appropriate for gifting than the latter item 405. In some embodiments, the giftability score for an item 405 indicates an appropriateness of gifting the item 405 for an occasion, demographic, etc. specified by the requesting customer. For example, suppose that the requesting customer specifies in the request to purchase the gift for the target customer that the gift is for an occasion corresponding to a birthday for a demographic corresponding to females between the ages of 12 and 17. In this example, if a giftability score for a collection of DVDs is higher than a giftability score for a collection of books, the giftability scores indicate that the collection of DVDs is more appropriate for gifting for the specified occasion and demographic than the collection of books.

In some embodiments, the giftability model may be trained by the online concierge system 140 (e.g., using the machine learning training module 230). In such embodiments, the online concierge system 140 may train the giftability model via supervised learning based on item data for items 405 included among the inventories 400 of one or more retailer locations and a label for each item 405 indicating an appropriateness of gifting the item 405. For example, the online concierge system 140 may receive a set of training examples including attributes of items 405 included among inventories 400 of one or more retailer locations. In this example, the online concierge system 140 also may receive a human-generated label for each item 405 indicating an appropriateness of gifting the item 405. Continuing with this example, the online concierge system 140 may then train the giftability model based on the attributes of the items 405 and the label for each item 405 by comparing its output from input data of each training example to the label for the training example.

The label for an item 405 may be determined or updated based on various types of information associated with the item 405. Examples of such information include order information indicating that the item 405 was a gift, a description from a manufacturer of the item 405 indicating an appropriateness of gifting the item 405, a response to suggesting the item 405 as a gift for a customer of the online concierge system 140, an item category associated with the item 405, packaging for the item 405, a price of the item 405, etc. For example, if order data for at least a threshold percentage of orders including an item 405 includes a gift receipt or a gift message associated with the orders or if the item 405 is included in a "gift" item category, the item 405 may be labeled to indicate it may be appropriate for gifting. As an additional example, if a description of an item 405 provided by its manufacturer includes the words "great gift idea," the packaging for the item 405 includes gift wrap, a bow, a basket, or other gift packaging, and the price of the item 405 is at least a threshold price, the item 405 may be labeled to indicate it may be appropriate for gifting. As yet another example, suppose that an item 405 that has been labeled as appropriate for gifting has been selected 340 by the online concierge system 140 as a suggested item for gifting to customers of the online concierge system 140, as further described below. In this example, the label for the item 405 may be updated to indicate it may not be appropriate for gifting if the item 405 is subsequently purchased for gifting to customers less than a threshold percentage of times it was selected 340 by the online concierge system 140 or if the customers to whom the item 405 was suggested indicated that it may not be appropriate for gifting (e.g., by closing a window presenting the item 405).

In some embodiments, the online concierge system 140 also may train the giftability model based on a label for each item 405 indicating an appropriateness of gifting the item 405 for a specific occasion, demographic, etc. In such embodiments, the label for an item 405 may be determined or updated based on order information indicating that the item 405 was a gift for a specific occasion, demographic, etc., a description from a manufacturer of the item 405 indicating an appropriateness of gifting the item 405 for a specific occasion, demographic, etc., or a response to suggesting the item 405 as a gift for a customer of the online concierge system 140 for a specific occasion, demographic, etc. In such embodiments, the label for an item 405 also may be determined or updated based on an item category associated with the item 405, packaging for the item 405, a price of the item 405, etc. For example, if order data for at least a threshold percentage of orders including an item 405 includes a gift message associated with the orders including the word "wedding" or if the item 405 is included in a "wedding gift" item category, the item 405 may be labeled to indicate it may be appropriate for gifting for a wedding. As an additional example, if a description of an item 405 provided by its manufacturer includes the words "great graduation gift idea," the packaging for the item 405 includes gift wrap with an image of a graduation cap and the words "congratulations graduate," and the price of the item 405 is at least a threshold price, the item 405 may be labeled to indicate it may be appropriate for gifting for a graduation. As yet another example, suppose that an item 405 that has been labeled as appropriate for gifting for males between 12 and 17 years old has been selected 340 by the online concierge system 140 as a suggested item for gifting to customers of the online concierge system 140, as further described below. In this example, the label for the item 405 may be updated to indicate it may not be appropriate for gifting for males between 12 and 17 years old if the item 405 is subsequently purchased for gifting to customers less than a threshold percentage of times it was selected 340 by the online concierge system 140 or if the customers to whom the item 405 was suggested indicated that it may not be appropriate for gifting for this demographic.

The online concierge system 140 then applies 325 (e.g., using the scoring module 212) the giftability model to attributes associated with each candidate item 410 to predict a giftability score for the candidate item 410. For example, as shown in FIG. 4A, each item 405 included among the set of candidate items 410 is associated with a giftability score 415 that indicates an appropriateness of gifting the corresponding item 405. In this example, since item F 405*f*, which has a giftability score 415 of 74, is associated with a much higher giftability score 415 than item N 405*g*, which has a giftability score 415 of 4, item F 405*f* is much more appropriate for gifting than item N 405*g*. As also shown in FIG. 4A, since item S 405*h*, which has a giftability score 415 of 52 is associated with a slightly higher giftability score 415 than item DG 405*k*, which has a giftability score 415 of 49, item S 405*h* is slightly more appropriate for gifting than item DG 405*k*.

Figure 4B:
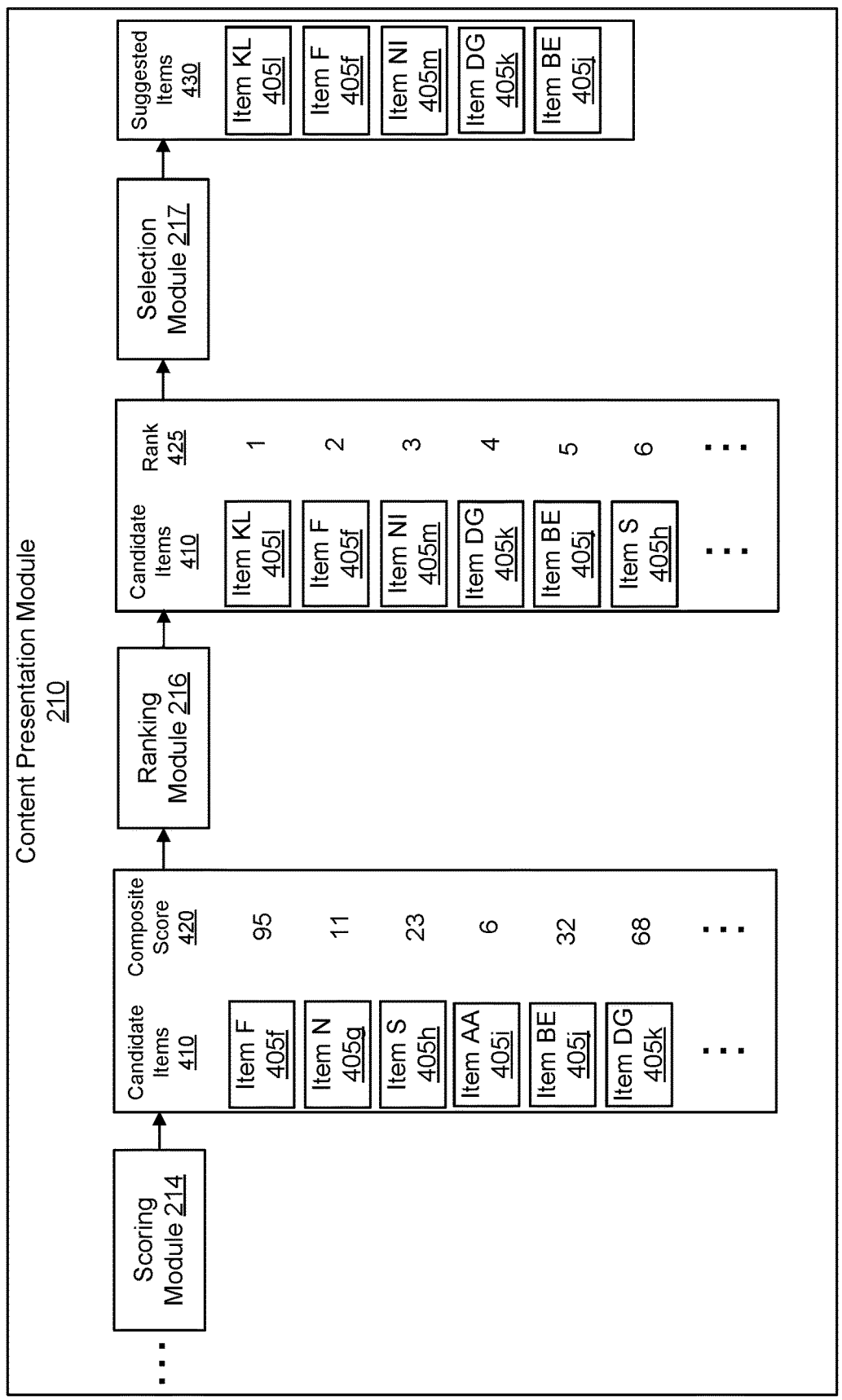

Referring again to FIG. 3, once the online concierge system 140 has applied 325 the giftability model to attributes associated with each candidate item 410 to predict a giftability score 415 for the candidate item 410, the online concierge system 140 computes 330 (e.g., using the scoring module 214) a composite score associated with each candidate item 410. The composite score associated with a candidate item 410 indicates an appropriateness of gifting the candidate item 410 to the target customer. The composite score associated with a candidate item 410 may be computed 330 by the online concierge system 140 based on the giftability score 415 associated with the candidate item 410 and the profile associated with the target customer. Additionally, the online concierge system 140 may use an item embedding describing a candidate item 410 and a customer embedding describing the target customer to compute 330 the composite score associated with the candidate item 410. For example, the composite score associated with a candidate item 410 may be computed 330 as a product of the giftability score 415 for the candidate item 410 and a dot product of an item embedding describing the candidate item 410 and a customer embedding describing the target customer. The item embedding describing each candidate item 410 and the customer embedding describing the target customer may be generated by separate machine learning models and may be stored in the online concierge system 140 (e.g., in the data store 240). Examples of composite scores for the set of candidate items 410 are shown in FIG. 4B, which continues the example described above in conjunction with FIG. 4A. As shown in FIG. 4B, since item F 405*f*, which has a composite score 420 of 95, is associated with a much higher composite score 420 than item AA 405*i*, which has a composite score 420 of 6, item F 405*f* is much more appropriate for gifting to the target customer than item AA 405*i*. As also shown in FIG. 4B, since item N 405*g*, which has a composite score 420 of 11 is associated with a slightly higher composite score 420 than item AA 405*i*, item N 405*g* is slightly more appropriate for gifting to the target customer than item AA 405*i*.

In some embodiments, the online concierge system 140 may boost (e.g., using the boosting module 215) a composite score 420 associated with a candidate item 410. In such embodiments, the composite score 420 may be boosted based on a bid value associated with the candidate item 410. A bid value associated with a candidate item 410 may be received from a retailer associated with a retailer location, a manufacturer associated with the candidate item 410, or any other suitable entity. For example, if a candidate item 410 is included among an inventory 400 of a retailer location, the online concierge system 140 may receive a bid value associated with the candidate item 410 from the retailer. A boosted composite score may be computed 330 as a sum, a product, or any other mathematical operation performed on a bid value and a composite score 420 associated with a candidate item 410. For example, the online concierge system 140 may boost a composite score 420 associated with a candidate item 410 by adding a bid value associated with the candidate item 410 to the composite score 420.

Referring back to FIG. 3, the online concierge system 140 then ranks 335 (e.g., using the ranking module 216) the set of candidate items 410 based on the composite score 420 associated with each candidate item 410. For example, as shown in FIG. 4B, the online concierge system 140 may rank 335 the items 405 included among the set of candidate items 410 based on their composite scores 420, such that items 405 having higher composite scores 420 have a higher rank 425 than items 405 having lower composite scores 420. In embodiments in which the online concierge system 140 boosts a composite score 420 for a candidate item 410, the online concierge system 140 may rank 335 the candidate item 410 based on its boosted composite score. For example, the online concierge system 140 may rank 335 the set of candidate items 410 based on their composite scores 420 or boosted composite scores, whichever is higher, such that candidate items 410 having higher composite scores 420 or boosted composite scores are ranked 335 higher than candidate items 410 having lower composite scores 420 or boosted composite scores.

Referring once more to FIG. 3, the online concierge system 140 then selects 340 (e.g., using the selection module 217) one or more suggested items from the set of candidate items 410 for gifting to the target customer. In some embodiments, once the online concierge system 140 has ranked 335 the set of candidate items 410, the online concierge system 140 may select 340 the suggested item(s) for gifting to the target customer based on the ranking. For example, as shown in FIG. 4B, the top 5 ranked items 405 included among the set of candidate items 410 may be selected 340 by the online concierge system 140 and included among the suggested items 430. In various embodiments, the online concierge system 140 may select 340 the suggested item(s) 430 for gifting to the target customer based on composite scores 420 or boosted composite scores associated with the set of candidate items 410. For example, the online concierge system 140 may select 340 the suggested item(s) from the set of candidate items 410, in which each suggested item has a composite score 420 or a boosted composite score that exceeds some threshold. In some embodiments, the suggested item(s) 430 may include gift cards that may be used to purchase other goods or products through the online concierge system 140. For example, a gift card may have a specific prepaid cash value that may be used to purchase items 405 from a retailer by placing an order including items 405 at a corresponding retailer location through the online concierge system 140. In this example, the gift card may be available exclusively through an online storefront for the retailer.

In some embodiments, the online concierge system 140 may then send (e.g., using the interface module 211) the suggested item(s) 430 for gifting to the target customer to a display area of the customer client device 100 associated with the requesting customer. In some embodiments, the online concierge system 140 may send the ranking of the set of candidate items 410 to the display area of the customer client device 100. For example, once the online concierge system 140 has ranked 335 the set of candidate items 410, the online concierge system 140 then sends the ranking to the display area of the customer client device 100.

ADDITIONAL CONSIDERATIONS

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method performed at a computer system comprising a processor and a computer-readable medium, the method comprising:
    receiving, from a first client device of a first user, a request to purchase a gift for a second user of an online concierge system, the first user being different from the second user, the first client device displaying a first user interface element that identifies a user identifier associated with the second user without containing personally identifiable information of the second user;
    retrieving, from a data store, a profile associated with the second user, wherein the profile comprises a set of attributes of the second user, an order history associated with the second user, or a list of items for which the second user has expressed a preference, wherein the profile of the second user is generated based on data received from a second client device of the second user, and retrieving the profile comprises:
        providing, by the second client device of the second user, an option to share the profile associated with the second user;
        receiving, from the second client device, a permission from the second user to share the profile associated with the second user; and
        retrieving, using the user identifier associated with the second user, the profile associated with the second user;
    identifying a set of candidate items included among a plurality of items for which the second user is likely to have an affinity based at least in part on the profile associated with the second user and a plurality of attributes associated with the plurality of items, wherein the plurality of items is included among one or more inventories of one or more retailer locations;
    accessing a machine learning model that is trained to predict a giftability score for an item, wherein the machine learning model is trained by:
        receiving the plurality of attributes associated with the plurality of items,
        receiving, for each item of the plurality of items, a label indicating an appropriateness of gifting a corresponding item, wherein the label is based at least in part on one or more of: an indication that the corresponding item included in an order is a gift, a description from a manufacturer indicating the appropriateness of gifting the corresponding item, a response to suggesting the corresponding item as a gift, an item category associated with the corresponding item, a packaging for the corresponding item, and a price of the corresponding item;
        training the machine learning model based at least in part on the plurality of attributes and the label for each of the plurality of items;
        receiving a result for at least one item of the plurality of items, the result indicating a percentage of times that the at least one item is subsequently purchased for gifting after the at least one item is recommended for gifting;
        responsive to the percentage of times is less than a threshold percentage of times, modifying the label of the at least one item; and
        updating the machine learning model based on the updated label;
    applying the machine learning model to the plurality of attributes associated with each candidate item of the set of candidate items to predict the giftability score for each candidate item;
    computing a composite score associated with each candidate item of the set of candidate items indicating the appropriateness of gifting a corresponding candidate item to the second user, wherein the composite score is based at least in part on the giftability score for the corresponding candidate item and the profile associated with the second user;
    ranking the set of candidate items based at least in part on the composite score associated with each candidate item of the set of candidate items;
    selecting, from the set of candidate items, one or more suggested items for gifting to the second user based at least in part on the ranking;
    responsive to receiving the request to purchase a gift for the second user, sending a message to the first client device of the first user, the message including a suggestion identifying the selected one or more suggested items for gifting;
    receiving, from the first client device of the first user, a selection of one or more of the suggested items to gift to the second user;
    identifying, based on the profile associated with the second user and the one or more selected items, a retail location where the selected items are available;
    generating and transmitting an order for the selected one or more items, including a delivery location of the second user, to a third client device associated with a picker for fulfillment;
    in response to receiving an acceptance of the order from the third client device of the picker, generating and transmitting navigation instructions to the third client device of the picker, directing the picker to the identified retailer location to collect the selected items, and directing the picker to the delivery location associated with the second user;
tracking locations of the third client device of the picker as the picker fulfills the order; and
generating and transmitting updated navigation instructions to the third client device of the picker based on the tracked locations of the third client device of the picker as the picker progresses towards the retailer location or the delivery location.

2. The method of claim 1, wherein identifying the set of candidate items included among the plurality of items for which the second user is likely to have the affinity comprises:
generating an embedding associated with the second user based at least in part on the profile associated with the second user;
generating a plurality of embeddings associated with the plurality of items based at least in part on the plurality of attributes associated with the plurality of items; and
identifying the set of candidate items included among the plurality of items for which the second user is likely to have the affinity based at least in part on a proximity between the embedding associated with the second user and each embedding of a set of embeddings included among the plurality of embeddings, wherein the set of embeddings is associated with the set of candidate items.

3. The method of claim 2, wherein the composite score associated with each candidate item of the set of candidate items is computed as a product of the giftability score for the corresponding candidate item and a dot product of the embedding associated with the second user and an additional embedding associated with the corresponding candidate item.

4. The method of claim 1, wherein the set of attributes of the second user comprises one or more of: a set of preferences of the second user, a set of responses to a questionnaire describing an affinity of the second user for one or more items included among the plurality of items, and a set of actions associated with one or more items included among the plurality of items performed by the second user on a social networking system.

5. The method of claim 1, further comprising:
receiving a set of bid values associated with a subset of the set of candidate items, wherein the set of bid values is received from a retailer associated with a retailer location; and
boosting the composite scores associated with the subset of the set of candidate items based at least in part on the set of bid values.

6. The method of claim 5, wherein ranking the set of candidate items is further based at least in part on the boosted composite scores.

7. The method of claim 1, wherein the order history associated with the second user is associated with a set of retailers and the suggested one or more candidate items comprises a gift card for a retailer not included among the set of retailers.

8. The method of claim 1, wherein identifying the set of candidate items included among the plurality of items for which the second user is likely to have the affinity is further based at least in part on one or more of: a catalog of items and a hierarchical taxonomy associated with the plurality of items, wherein the hierarchical taxonomy is based at least in part on one or more item categories associated with each item of the plurality of items.

9. A computer program product comprising a non-transitory computer readable storage medium having instructions encoded thereon that, when executed by a processor, cause the processor to:
receive, from a first client device of a first user, a request to purchase a gift for a second user of an online concierge system, the first user being different from the second user, the first client device displaying a first user interface element that identifies a user identifier associated with the second user without containing personally identifiable information of the second user;
retrieve, from a data store, a profile associated with the second user, wherein the profile comprises a set of attributes of the second user, an order history associated with the second user, or a list of items for which the second user has expressed a preference, and wherein the profile of the second user is generated based on data received from a second client device of the second user, and retrieving the profile comprises:
providing, by the second client device of the second user, an option to share the profile associated with the second user;
receiving, from the second client device, a permission from the second user to share the profile associated with the second user; and
retrieving, using the user identifier associated with the second user, the profile associated with the second user;
identify a set of candidate items included among a plurality of items for which the second user is likely to have an affinity based at least in part on the profile associated with the second user and a plurality of attributes associated with the plurality of items, wherein the plurality of items is included among one or more inventories of one or more retailer locations;
access a machine learning model that is trained to predict a giftability score for an item, wherein the machine learning model is trained by:
receiving the plurality of attributes associated with the plurality of items,
receiving, for each item of the plurality of items, a label indicating an appropriateness of gifting a corresponding item, wherein the label is based at least in part on one or more of: an indication that the corresponding item included in an order is a gift, a description from a manufacturer indicating the appropriateness of gifting the corresponding item, a response to suggesting the corresponding item as a gift, an item category associated with the corresponding item, a packaging for the corresponding item, and a price of the corresponding item;
training the machine learning model based at least in part on the plurality of attributes and the label for each of the plurality of items;
receiving a result for at least one item of the plurality of items, the result indicating a percentage of times that the at least one item is subsequently purchased for gifting after the at least one item is recommended for gifting;
responsive to the percentage of times is less than a threshold percentage of times, modifying the label of the at least one item; and
updating the machine learning model based on the updated label;

apply the machine learning model to the plurality of attributes associated with each candidate item of the set of candidate items to predict the giftability score for each candidate item;

compute a composite score associated with each candidate item of the set of candidate items indicating the appropriateness of gifting a corresponding candidate item to the second user, wherein the composite score is based at least in part on the giftability score for the corresponding candidate item and the profile associated with the second user;

rank the set of candidate items based at least in part on the composite score associated with each candidate item of the set of candidate items;

select, from the set of candidate items, one or more suggested items for gifting to the second user based at least in part on the ranking;

responsive to receiving the request to purchase a gift for the second user, send a message to the first client device of the user, the message including a suggestion identifying the selected one or more suggested items for gifting;

receive, from the first client device of the first user, a selection of one or more of the suggested items to gift to the second user;

identify, based on the profile associated with the second user and the one or more selected items, a retail location where the selected items are available;

generate and transmit an order for the selected one or more items, including a delivery location of the second user, to a third client device associated with a picker for fulfillment;

in response to receiving an acceptance of the order from the third client device of the picker, generate and transmit navigation instructions to the third client device of the picker, directing the picker to the identified retailer location to collect the selected items, and further directing the picker to the delivery location associated with the second user;

tracking locations of the third client device of the picker as the picker fulfills the order; and generate and transmit updated navigation instructions to the third client device of the picker based on the tracked locations of the third client device of the picker as the picker progresses towards the retailer location or the delivery location.

10. The computer program product of claim 9, wherein identify the set of candidate items included among the plurality of items for which the second user is likely to have the affinity comprises:

generate an embedding associated with the second user based at least in part on the profile associated with the second user;

generate a plurality of embeddings associated with the plurality of items based at least in part on the plurality of attributes associated with the plurality of items; and identify the set of candidate items included among the plurality of items for which the second user is likely to have the affinity based at least in part on a proximity between the embedding associated with the second user and each embedding of a set of embeddings included among the plurality of embeddings, wherein the set of embeddings is associated with the set of candidate items.

11. The computer program product of claim 10, wherein the composite score associated with each candidate item of the set of candidate items is computed as a product of the giftability score for the corresponding candidate item and a dot product of the embedding associated with the second user and an additional embedding associated with the corresponding candidate item.

12. The computer program product of claim 9, wherein the set of attributes of the second user comprises one or more of: a set of preferences of the second user, a set of responses to a questionnaire describing an affinity of the second user for one or more items included among the plurality of items, and a set of actions associated with one or more items included among the plurality of items performed by the second user on a social networking system.

13. The computer program product of claim 9, wherein the non-transitory computer readable storage medium further has instructions encoded thereon that, when executed by the processor, cause the processor to:

receive a set of bid values associated with a subset of the set of candidate items, wherein the set of bid values is received from a retailer associated with a retailer location; and boost the composite scores associated with the subset of the set of candidate items based at least in part on the set of bid values.

14. The computer program product of claim 13, wherein rank the set of candidate items is further based at least in part on the boosted composite scores.

15. The computer program product of claim 9, wherein the order history associated with the second user is associated with a set of retailers and the suggested one or more candidate items comprises a gift card for a retailer not included among the set of retailers.

16. The computer program product of claim 9, wherein identify the set of candidate items included among the plurality of items for which the second user is likely to have the affinity is further based at least in part on one or more of: a catalog of items and a hierarchical taxonomy associated with the plurality of items, wherein the hierarchical taxonomy is based at least in part on one or more item categories associated with each item of the plurality of items.

17. A computer system comprising:
a processor; and
a non-transitory computer readable storage medium storing instructions that, when executed by the processor, perform actions comprising:
receiving, from a first client device of a first user, a request to purchase a gift for a second user of an online concierge system, the first user being different from the second user, the first client device displaying a first user interface element that identifies a user identifier associated with the second user without containing personally identifiable information of the second user;
retrieving, from a data store, a profile associated with the second user, wherein the profile comprises a set of attributes of the second user, an order history associated with the second user, or a list of items for which the second user has expressed a preference, wherein the profile of the second user is generated based on data received from a second client device of the second user, and retrieving the profile comprises:
providing, by the second client device of the second user, an option to share the profile associated with the second user;
receiving, from the second client device, a permission from the second user to share the profile associated with the second user; and retrieving, using the user identifier associated with the second user, the profile associated with the second user;

identifying a set of candidate items included among a plurality of items for which the second user is likely to have an affinity based at least in part on the profile associated with the second user and a plurality of attributes associated with the plurality of items, wherein the plurality of items is included among one or more inventories of one or more retailer locations;

accessing a machine learning model that is trained to predict a giftability score for an item, wherein the machine learning model is trained by:
  receiving the plurality of attributes associated with the plurality of items,
  receiving, for each item of the plurality of items, a label indicating an appropriateness of gifting a corresponding item, wherein the label is based at least in part on one or more of: an indication that the corresponding item included in an order is a gift, a description from a manufacturer indicating the appropriateness of gifting the corresponding item, a response to suggesting the corresponding item as a gift, an item category associated with the corresponding item, a packaging for the corresponding item, and a price of the corresponding item;
  training the machine learning model based at least in part on the plurality of attributes and the label for each of the plurality of items;
  receiving a result for at least one item of the plurality of items, the result indicating a percentage of times that the at least one item is subsequently purchased for gifting after the at least one item is recommended for gifting;
  responsive to the percentage of times is less than a threshold percentage of times, modifying the label of the at least one item; and
  updating the machine learning model based on the updated label;

applying the machine learning model to the plurality of attributes associated with each candidate item of the set of candidate items to predict the giftability score for each candidate item;

computing a composite score associated with each candidate item of the set of candidate items indicating the appropriateness of gifting a corresponding candidate item to the second user, wherein the composite score is based at least in part on the giftability score for the corresponding candidate item and the profile associated with the second user;

ranking the set of candidate items based at least in part on the composite score associated with each candidate item of the set of candidate items;

selecting, from the set of candidate items, one or more suggested items for gifting to the second user based at least in part on the ranking;

responsive to receiving the request to purchase a gift for the second user, sending a message to the first client device of the first user, the message including a suggestion identifying the selected one or more suggested items for gifting;

receiving, from the first client device of the first user, a selection of one or more of the suggested items to gift to the second user;

identifying, based on the profile associated with the second user and the one or more selected items, a retail location where the selected items are available;

generating and transmitting an order for the selected one or more items, including a delivery location of the second user, to a third client device associated with a picker for fulfillment;

in response to receiving an acceptance of the order from the third client device of the picker, generating and transmitting navigation instructions to the third client device of the picker, directing the picker to the identified retailer location to collect the selected items, and directing the picker to the delivery location associated with the second user;

tracking locations of the third client device of the picker as the picker fulfills the order; and generating and transmitting updated navigation instructions to the third client device of the picker based on the tracked locations of the third client device of the picker as the picker progresses towards the retailer location or the delivery location.

18. The computer system of claim 17, wherein identifying the set of candidate items included among the plurality of items for which the second user is likely to have the affinity comprises:

generating an embedding associated with the second user based at least in part on the profile associated with the second user;

generating a plurality of embeddings associated with the plurality of items based at least in part on the plurality of attributes associated with the plurality of items; and identifying the set of candidate items included among the plurality of items for which the second user is likely to have the affinity based at least in part on a proximity between the embedding associated with the second user and each embedding of a set of embeddings included among the plurality of embeddings, wherein the set of embeddings is associated with the set of candidate items.

* * * * *